Oct. 30, 1956 G. E. CARLE 2,768,406
WEDGE-LOCKING MECHANISM FOR MACHINE SLIDES
Filed Sept. 8, 1954 2 Sheets-Sheet 1

Inventor
George E. Carle
By
Attorneys

Oct. 30, 1956         G. E. CARLE        2,768,406
WEDGE-LOCKING MECHANISM FOR MACHINE SLIDES
Filed Sept. 8, 1954                                               2 Sheets-Sheet 2
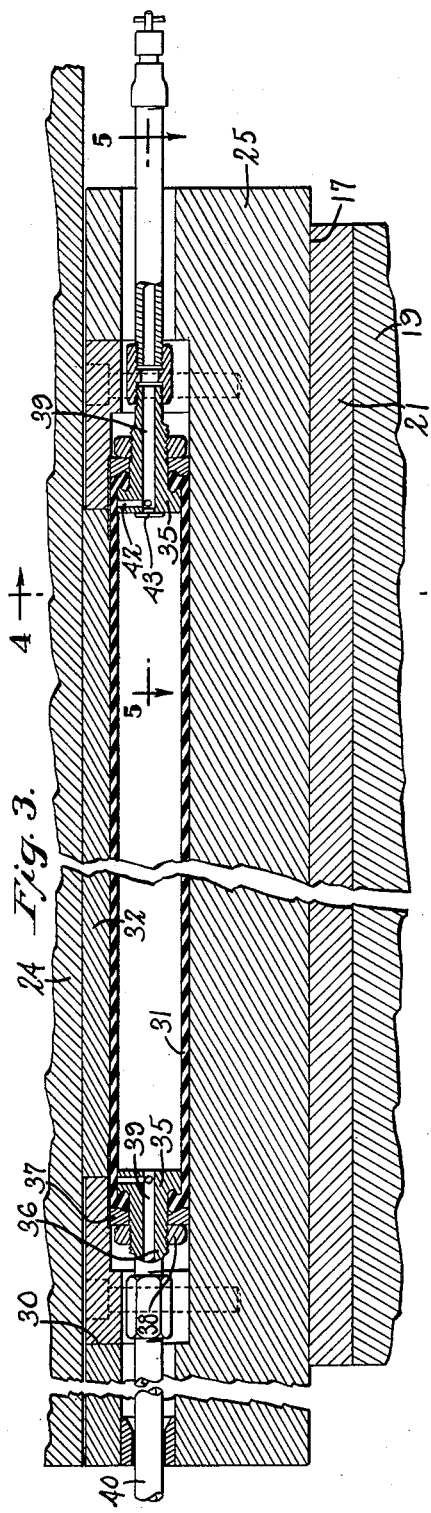
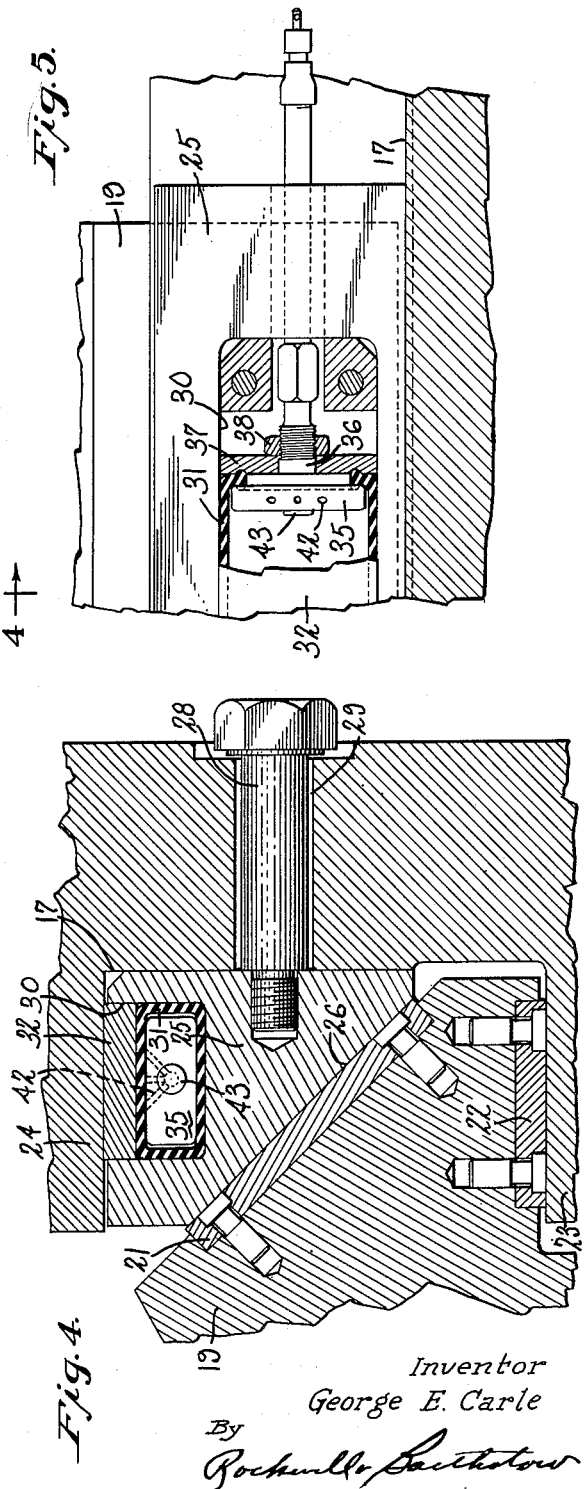
Inventor
George E. Carle
By
Rockwell Lauthrow
Attorneys United States Patent Office 2,768,406
Patented Oct. 30, 1956

2,768,406

WEDGE-LOCKING MECHANISM FOR MACHINE SLIDES

George E. Carle, Derby, Conn., assignor to Farrel-Birmingham Company, Incorporated, Ansonia, Conn., a corporation of Connecticut Application September 8, 1954, Serial No. 454,725

8 Claims. (Cl. 18—12)

This invention relates to a wedge-locking mechanism for machine slides, and more particularly to a fluid-pressure-operated means for locking or clamping a machine slide in a predetermined position so as to prevent play or movement of the slide or carriage, as the case may be, with respect to the guideway within which it moves. While I have illustrated the invention as applied to the carriage slide supporting the cone plug of a machine for extruding plastic materials, it will be understood that the invention is not confined to this use but is applicable to carriage slides of machines of other types.

In devices wherein a carriage or slide is mounted for movement in guideways, there must be a certain amount of clearance between these guideways and the shoe members or other portions of the slide mounted in the guideways. Moreover, even if this clearance is originally quite small, it often occurs that the clearance increases due to wear, and hence there is a considerable amount of play between the slide and the guideways in the frame of the machine, so that the slide is not firmly and rigidly held in a position to which it may be adjusted.

Such a condition is found, for example, in a machine for extruding plastic materials wherein the materials are forced through a cylindrical chamber and out a discharge opening around a cone head or the like to provide for the discharge of material in cylindrical form. It has been proposed to support such a cone head by rigidly mounting it upon a sliding carriage, the carriage being movable toward and from the chamber so as to withdraw the cone head from and move it into a cooperative position with the discharge opening of the chamber. In this case the connection of the mandrel of the cone head with the carriage is at some distance from the end of the chamber, and any movement or play of the carriage or slide in its guideways will be magnified or increased at the plug or head itself, so that it is desirable that the carriage be firmly clamped in the guideways in which it moves when in operative position in order that the cone plug will be held firmly in position and a cylinder of material of uniform gauge will be obtained.

It is contemplated by the present invention to provide means for clamping the sliding shoe members of the carriage in the guideways on the frame in which the shoe members move, by means of an inflatable member or diaphragm into which a fluid under pressure may be introduced to effect a clamping action of the shoe members of the slide against a wall of the guideway. More specifically, a wedge gib is provided within the guideway in the frame in which the shoe member of the carriage slides, and the inflatable member or diaphragm is mounted in a recess in the wedge gib. This wedge gib is mounted to float or move in the guideway so that, upon inflation of the diaphragm, the gib may be moved against the shoe member of the carriage, and the latter in turn forced against a wall of the guideway.

By such a construction all play of the shoe member of the slide in the guideway may be taken up so that the slide or carriage will be effectively clamped in place, and movement of the cone plug carried by the slide relatively to the chamber of the extrusion device will be prevented. While, as illustrated, this floating or movable wedge gib and inflatable member are provided in one only of the two guideways for the carriage slide, it will be understood that the construction may be applied on both sides of the carriage slide if desired.

One object of the present invention is to provide means for firmly locking or clamping a carriage slide in a predetermined position with respect to the guideways in the member upon which the carriage is movably mounted.

A further object of the invention is to provide a machine having a frame and a carriage slidably mounted for movement within guideways in the frame, with means for firmly clamping the carriage slide within said guideways so as to prevent relative movement between the carriage slide and its supporting member.

Still another object of the invention is to provide in a machine having a supporting frame and a carriage having shoe members slidably mounted within guideways in said frame, means for clamping the shoe members firmly against movement in the guideways, said means comprising a gib floatingly or movably mounted in the guideway, and pressure-fluid inflatable means for moving said gib against the shoe members of the carriage slide to hold the latter firmly in position.

To these and other ends the invention consists in the novel features and combinations of parts to be hereinafter described and claimed.

In the accompanying drawings:

Fig. 3 is a sectional view through the guideway of the carriage slide on line 3—3 of Fig. 2;

Fig. 4 is a sectional view on line 4—4 of Fig. 3; and

Fig. 5 is a sectional view on line 5—5 of Fig. 3.

Figure 1:
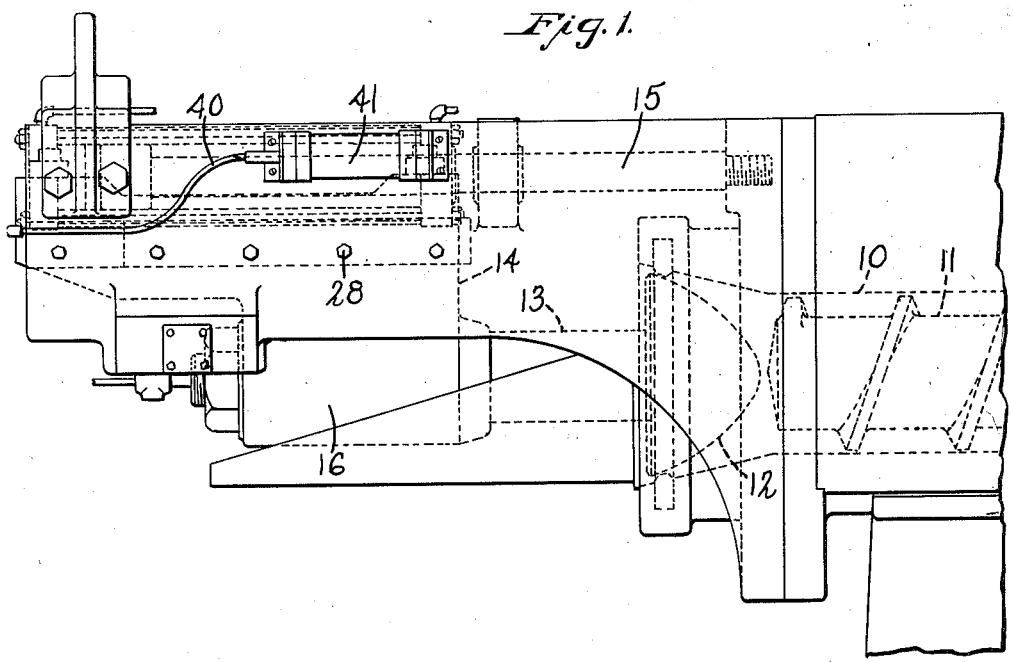
Fig. 1 is a side elevational view of the discharge end of an extrusion device embodying my invention.

To illustrate a preferred embodiment of my invention I have shown a machine for extruding plastic materials, the machine comprising a chamber 10 having a conveyor screw 11 therein for forcing materials through the chamber. Within the discharge end of the chamber is mounted a cone plug or cone head 12, which, as is well understood in the art, will cause the material to be extruded from the material in cylindrical form.

This cone head is mounted for movement toward and from the chamber so that it may be removed from the discharge opening in order to permit access to the same, and for this purpose the cone head is carried upon a mandrel 13, this mandrel at its other end being secured to a carriage 14, which, as will be hereinafter explained, is slidably mounted in an overhead supporting frame 15.

The frame 15 is mounted at the end of the chamber 10 so as to support the carriage above the axis of the chamber, the latter having a depending portion 16 to which the mandrel 13 is secured. As shown more especially in Fig. 2, the frame 15 is provided with opposed ways 17 and 18 at its opposite sides, and the carriage 14 is provided with shoe members 19 and 20 slidably mounted within the ways 17 and 18, respectively. This provides for sliding movement of the carriage in the overhead supporting frame 15 to move the cone head 12 into the discharge end of the cylinder 10, or to remove it therefrom. The construction thus far described is of substantially the form shown in the application of Donald C. Chase and Warren C. Whittum for patent upon an Extrusion Device, Serial No. 293,398, filed June 13, 1952. As no claim is made to such construction herein, no further description thereof is necessary.

As shown more especially in Fig. 4, the upper surface of the shoe 19 is beveled so as to lie in an inclined position, and upon this surface is mounted a wear plate 21. Also a wear plate 22 may be provided upon the lower surface of the shoe 19 to bear against the wall 23 of the guideway 17, this guideway also being provided with an upper opposing wall 24.

Movably or floatingly mounted within the guideway 17 is a wedge gib 25, this gib extending longitudinally of the guideway throughout substantially its entire length, and being wedge-shaped so as to be provided with an inclined surface 26 to abut against the similarly inclined surface of the wear plate 21 secured to the shoe member 19. In order that the wedge gib 25 may have some freedom of movement within the guideway 17, it is held in place by means of a bolt or screw 28 threaded into the gib and mounted within an enlarged opening 29 in the wall of the frame 15, this screw being shouldered so as to limit its insertion into the gib whereby the latter may float or move laterally as well as vertically.

The gib 25 is provided with an upwardly facing recess 30 which extends longitudinally of the gib and opens through the upper surface thereof. Within this recess is mounted an inflatable member or diaphragm 31 of a flexible material such as rubber or the like, and upon the upper surface of this diaphragm is secured a wear strip 32 designed to bear against the upper wall 24 of the way 17 when the diaphragm is inflated.

As shown, the inflatable diaphragm 31 is of rectangular shape in cross section and of elongated form extending throughout the greater portion of the length of the wedge gib 25, and it will also be noted that, as shown in Fig. 4, there is some clearance between the top of the gib and the upper wall 24 of the way 17, so that, when the diaphragm is deflated or when no pressure exists therein, the wear strip 32 will not be engaged with the surface 24, and therefore the wedge gib will not be forced against the wear plate 21.

The inflatable member 31 may be open at its ends, and, as shown in Fig. 3, clamping plates 35 attached to tubular members 36 may be inserted in the ends of this member and the free ends clamped against the plates 35 by cooperating plates 37 and nuts 38 so as to close the ends of this member except for the openings 39 through the tubular members 36. The tubular member 36 at the left-hand end of the inflatable diaphragm, as shown in Fig. 3, may be connected by a pipe 40 to a source of fluid under pressure, such as oil, for example, so that pressure may be introduced into the inflatable member, the pipe 40, as shown in Fig. 1, being connected to a pressure booster 41, which is in turn connected to a source of pressure fluid.

The clamping plates 35 are provided with bleed openings 42, and while the construction is the same at both ends of the diaphragm 31, a plug 43 is provided to close the bore 39 at the bleed end of the member. With this construction the inflatable member may be filled with oil through the tube 40 at the left-hand end, as shown in Fig. 3, the plug 43 closing the other end. However, the air in the member will be expelled through the bleed opening 42 at the right-hand end, and will be permitted to escape through the bore 39, so that no air will be trapped in the member and proper hydraulic pressure may be obtained therein.

It will be understood that the inflatable member is always kept full of oil, but pressure is relieved when it is desired to move the carriage toward or from the cylinder of the extrusion device. When, however, the device is in operation and it is desired to hold the cone plug 12 firmly in place, fluid pressure will be introduced into the inflatable diaphragm 31. This will cause the diaphragm to expand and cause the wear strip 32 to engage the wall 24 of the way 17 and force the wedge gib downwardly against the wear plate 21 of the shoe member 19 of the carriage slide and lock the latter firmly against movement. It will be understood that only slight movement of the wedge gib is necessary, and therefore only slight expansion of the diaphragm, as it is only required to eliminate the normal sliding clearance between the shoe member 19 and the adjacent parts of the structure. When it is desired to move the slide, the pressure is relieved in the pipe 40 and the diaphragm 31 will thereupon deflate slightly and thus release the clamping action.

Figure 2:
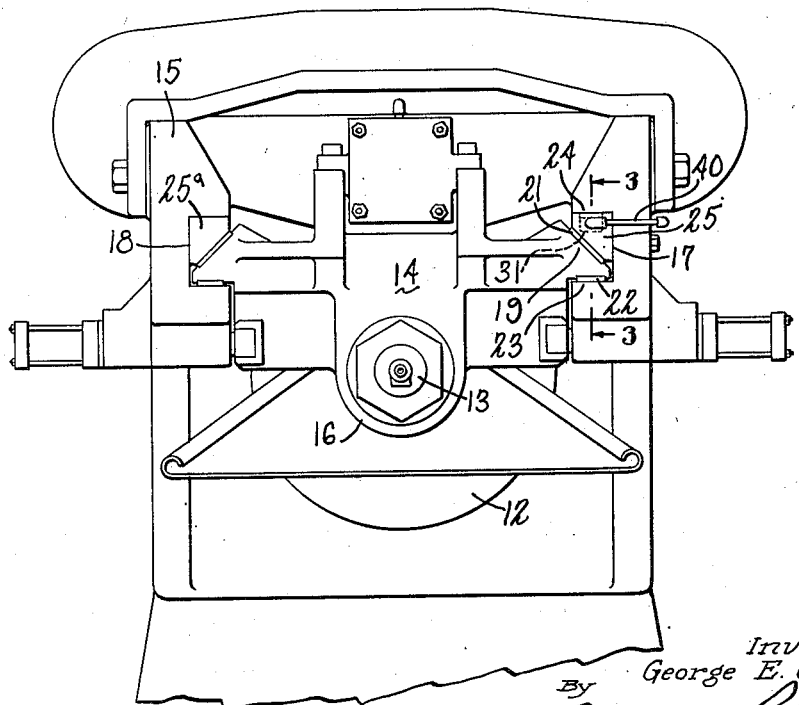
Fig. 2 is an end view of the parts shown in Fig. 1, looking toward the right.

As shown, a wedge gib 25ª is provided upon the opposite side of the carriage slide, as illustrated in Fig. 2, but as it is considered necessary to lock only one side of the carriage, the wedge gib 25ª is secured to the frame 15. If desired, however, the same construction may be employed at both sides of the slide and the inflatable member provided to lock the carriage at both sides thereof.

While I have shown and described a preferred embodiment of my invention, it will be understood that it is not to be limited to all of the details shown, but is capable of modification and variation within the spirit of the invention and within the scope of the claims.

What I claim is:

1. In a machine having a sliding carriage, a frame provided with guideways, a carriage having shoe members slidably mounted in said guideways, means to clamp said carriage in said guideways comprising a wedge member movably mounted in one of the guideways between a wall thereof and said slide member, an inflatable member carried by said wedge member, and means for introducing fluid pressure into said member to force said wedge member against the slide.

2. In a machine having a sliding carriage, a frame provided with guideways, a carriage having shoe members slidably mounted in said guideways, means to clamp said carriage in said guideways comprising a wedge member movably mounted in one of the guideways between a wall thereof and the corresponding shoe member, said wedge member having a recess therein, an expansible envelope mounted in said recess to substantially fill the same, and means for introducing fluid pressure into said envelope to force said wedge into tight contact between the wall of the guideway and said shoe member to clamp the carriage firmly in the frame.

3. In a device of the character described, a sliding carriage, a frame having spaced walls providing guideways for said carriage, said carriage having shoe members slidably received in said guideways, means to clamp said carriage in said guideways comprising a wedge member floatingly connected to said frame and disposed within one of said guideways between a wall thereof and the shoe member therein, and a pressure-fluid inflatable member carried by said wedge member and adapted when inflated to clamp said shoe member firmly against the other wall of the guideway.

4. In a device of the character described, a sliding carriage, a frame having spaced walls providing guideways for said carriage, said carriage having shoe members slidably received in said guideways, means to clamp said carriage in said guideways comprising a wedge member floatingly connected to said frame and disposed within one of said guideways between a wall thereof and the shoe member therein, a pressure-fluid inflatable member carried by said wedge member and adapted when inflated to clamp said shoe member firmly against the other wall of the guideway, said inflatable member being mounted in a recess in said wedge member, and a wear strip carried by the face of said inflatable member exposed through said recess.

5. In a device of the character described, a sliding carriage, a frame having spaced walls providing guideways for said carriage, said carriage having shoe members slidably received in said guideways, means to clamp said carriage in said guideways comprising a wedge member floatingly connected to said frame and disposed within and extending longitudinally of one of said guideways between a wall thereof and the shoe member therein, said wedge member having a recess in its surface facing said wall, a pressure-fluid inflatable member disposed in said recess, and means to introduce fluid under pressure in said inflatable member to move said wedge member and clamp the shoe member against movement in the guideway.

6. An extrusion device having a chamber provided with a discharge opening, a cone head to cooperate with said opening, means supporting said head for movement toward and from the opening comprising a carriage, frame means connected to the chamber and having a guideway, said carriage having a shoe member slidably received in the guideway, a wedge gib in said guideway and extending longitudinally thereof adjacent the shoe member, an inflatable member carried by said gib and adapted when inflated to force the latter against the shoe member to clamp the shoe member in the guideway, and means for introducing pressure fluid into said inflatable member.

7. An extrusion device having a chamber provided with a discharge opening, a cone head to cooperate with said opening, means supporting said head for movement toward and from the opening comprising a carriage, frame means connected to the chamber and having a guideway, said carriage having a shoe member slidably received in the guideway, a wedge gib in said guideway and extending longitudinally thereof adjacent the shoe member, an inflatable member carried by said gib and adapted when inflated to force the latter against the shoe member to clamp the shoe member in the guideway, means for introducing pressure fluid into said inflatable member, said inflatable member acting between said wedge gib and a wall of the guideway, and a wear strip carried by said member to engage the wall of the guideway.

8. An extrusion device having a chamber provided with a discharge opening, a cone head to cooperate with said opening, means supporting said head for movement toward and from the opening comprising a carriage, frame means connected to the chamber and having a guideway, said carriage having a shoe member slidably received in the guideway, a wedge gib in said guideway having a longitudinal recess therein opening toward a wall of the guideway, an inflatable member mounted in said recess, a wear strip on the outer surface of said inflatable member to engage the wall of the guideway, and means to introduce fluid pressure into said inflatable member to force said wear strip against the wall of the guideway and force said wedge gib against said shoe member to lock the carriage against movement in the frame.

References Cited in the file of this patent

UNITED STATES PATENTS

| | | |
|---|---|---|
| 1,993,349 | Parkhurst | Mar. 5, 1935 |
| 2,009,421 | Walz | July 30, 1935 |
| 2,165,662 | Swan | July 11, 1939 |
| 2,440,919 | Shaw | May 4, 1948 |
| 2,491,384 | MacMillin et al. | Dec. 13, 1949 |
| 2,562,135 | Strobel | July 24, 1951 |
| 2,636,579 | De Haas | Apr. 28, 1953 |
| 2,640,565 | Hoppenstand | June 2, 1953 |